United States Patent [19]
Pejathaya

[11] Patent Number: 5,979,986
[45] Date of Patent: Nov. 9, 1999

[54] LINEAR SEAT RECLINER WITH EASY ENTRY MEMORY FEATURE

[75] Inventor: Srinivas Pejathaya, St. Clair Shores, Mich.

[73] Assignee: Fisher Dynamics Corporation, St. Clair Shores, Mich.

[21] Appl. No.: 09/102,140

[22] Filed: Jun. 22, 1998

Related U.S. Application Data

[63] Continuation-in-part of application No. 08/789,838, Jan. 29, 1997, Pat. No. 5,769,493, which is a continuation-in-part of application No. 08/607,949, Feb. 28, 1996, Pat. No. 5,660,440.

[51] Int. Cl.$^6$ ....................................................... B60N 2/02
[52] U.S. Cl. ...................... 297/362.12; 297/375; 297/369
[58] Field of Search ............................ 297/362.12, 361.1, 297/375, 378.12, 368, 369

[56] References Cited

U.S. PATENT DOCUMENTS

| | | |
|---|---|---|
| 3,328,076 | 6/1967 | Naef . |
| 3,635,525 | 1/1972 | Magyar . |
| 3,736,025 | 5/1973 | Ziegler et al. ........................... 297/369 |
| 3,957,312 | 5/1976 | Bonnaud . |
| 4,065,178 | 12/1977 | Carella et al. . |
| 4,394,047 | 7/1983 | Brunelle .............................. 297/362.12 |
| 4,502,730 | 3/1985 | Kazaoka et al. . |
| 4,579,386 | 4/1986 | Rupp et al. ........................ 297/362.12 |
| 4,660,886 | 4/1987 | Terada et al. . |
| 4,799,733 | 1/1989 | Beley et al. . |
| 4,822,101 | 4/1989 | Hosoe . |
| 4,865,386 | 9/1989 | Detloff et al. ........................... 297/375 |
| 4,881,775 | 11/1989 | Rees ...................................... 297/361.1 |
| 4,898,424 | 2/1990 | Bell ...................................... 297/395 X |
| 4,925,228 | 5/1990 | Pipon et al. . |
| 5,052,752 | 10/1991 | Robinson ................................ 297/375 |
| 5,269,588 | 12/1993 | Kunz et al. . |
| 5,280,999 | 1/1994 | Jones et al. ........................... 297/361.1 |
| 5,299,853 | 4/1994 | Griswold et al. ................ 297/361.1 X |
| 5,320,413 | 6/1994 | Griswold et al. ................... 297/362.12 |
| 5,344,215 | 9/1994 | Dahlbacka ............................... 297/375 |
| 5,360,256 | 11/1994 | Miller et al. ......................... 297/361.1 |
| 5,390,981 | 2/1995 | Griswold ............................ 297/378.12 |
| 5,393,123 | 2/1995 | Hernandez et al. .............. 297/378.12 |
| 5,568,843 | 10/1996 | Porter et al. ............................ 297/375 |
| 5,618,083 | 4/1997 | Martone et al. ............... 297/362.12 X |
| 5,660,440 | 8/1997 | Pejathaya ............................ 297/362.12 |
| 5,718,482 | 2/1998 | Robinson ....................... 297/362.12 X |
| 5,727,847 | 3/1998 | Martone et al. ........................ 297/375 |
| 5,769,493 | 6/1998 | Pejathaya ........................... 297/362.12 |
| 5,823,622 | 10/1998 | Fisher, IV et al. ................ 297/362.12 |

Primary Examiner—Peter M. Cuomo
Assistant Examiner—Rodney B. White
Attorney, Agent, or Firm—Harness, Dickey & Pierce P.L.C.

[57] ABSTRACT

A seat assembly having a linear recliner assembly is disclosed that is operable for permitting selective reclining movement of a seatback relative to a seat bottom from an upright position through a range of reclined positions to a preselected use position. The linear recliner assembly is further operable to permit the seatback to be pivoted from any preselected use position to a forward dumped position. Upon return of the seatback from the forward dumped position, the linear recliner assembly is adapted to re-latch the seatback in its previous use position.

21 Claims, 4 Drawing Sheets

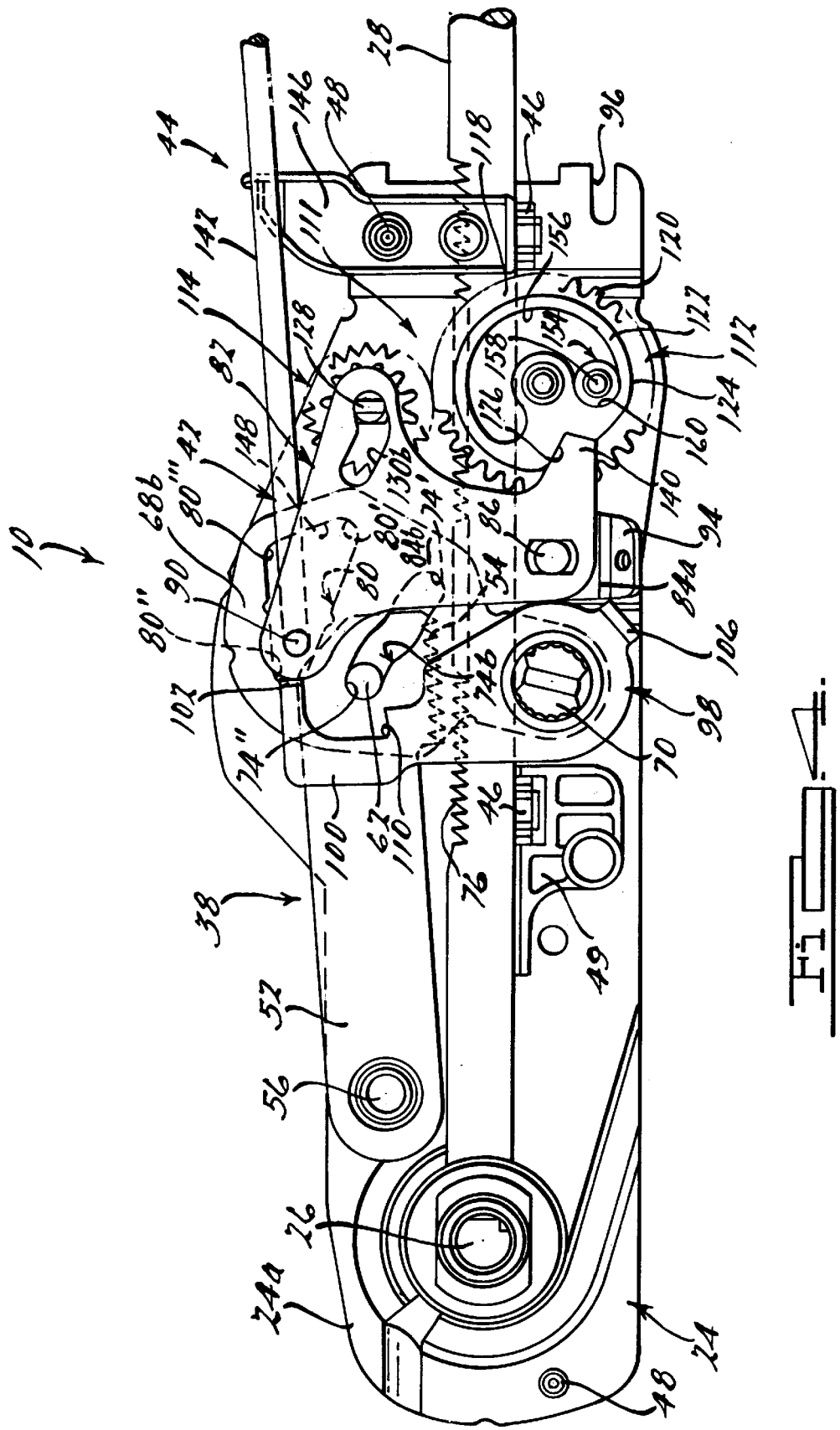

LINEAR SEAT RECLINER WITH EASY ENTRY MEMORY FEATURE

CROSS REFERENCE TO RELATED APPLICATION

This application is a continuation-in-part of U.S. application Ser. No. 08/789,838 filed Jan. 29, 1997 (now U.S. Pat. No. 5,769,493) which is a continuation-in-part of U.S. application Ser. No. 08/607,949 filed Feb. 28, 1996 (now U.S. Pat. No. 5,660,440).

BACKGROUND OF THE INVENTION

1. Field of the Invention

The present invention relates generally to a seat assembly for motor vehicles and, more specifically, to a linear recliner assembly having a memory feature which returns the seatback to its previous use position after forward dumping thereof.

2. Description of the Background Art

Virtually all motor vehicles are now equipped with seats having a recliner mechanism that can be selectively actuated for permitting adjustment of the "use" position of the seatback relative to the seat bottom between an upright position and a fully-reclined position. In most two door vehicles, the front seats also include a seatback dump mechanism that can be selectively actuated for permitting forward folding (i.e., "dumping") of the seatback to provide greater access to the area behind the front seats in the vehicle passenger compartment.

In some vehicle seat applications, the recliner mechanism is released when the dump mechanism is actuated to permit movement of the seatback from its use position into its forward dumped position. However, when the seatback is subsequently returned from its dumped position, the recliner mechanism latches the seatback in a preselected position (i.e., the upright position). Thereafter, the seat occupant must again actuate the recliner mechanism to return the seatback to the desired use position. To alleviate this inconvenience, some vehicle seats are also equipped with a memory mechanism which works in conjunction with the recliner mechanism and the dump mechanism to cause the seatback to be relatched in its last or previous use position following return of the seatback from its dumped position.

SUMMARY OF THE INVENTION

Accordingly, it is an object of the present invention to provide a reclining seat assembly having a linear recliner assembly operably coupling a seatback to a seat bottom to permit selective reclining and dumping movement of the seatback and which includes a memory feature for returning the seatback to its previous use position after a dumping operation has been performed.

A further object of the present invention is to provide a linear recliner assembly for a vehicle seat which is operable to permit the angular use position of the seatback to be adjusted independent of a memory feature which returns the seatback to its previous use position after a dumping operation has been performed.

It is a further object of the present invention to provide a linear recliner assembly with a trigger mechanism that is operable to prevent engagement of a latching mechanism until the seatback is returned to its previous use position.

Still another object of the present invention is to provide a linear recliner assembly having the above-noted features which is simple in structure, inexpensive to manufacture and durable in use.

These and other objects are obtained by providing a linear recliner assembly that is operable for permitting selective reclining movement of the seatback relative to a seat bottom through a range of use position defined between an upright position and a fully-reclined position. The linear recliner assembly is further operable to permit the seatback to be pivoted from any use position to a forward dumped position. Upon return of the seatback from its forward dumped position, the linear recliner assembly is adapted to re-latch the seatback in its previous use position. In a presently preferred embodiment, the linear recliner assembly includes a housing adapted to be secured to one of the seatback and the seat bottom, a recliner rod supported from the housing for relative linear movement and operably coupled to the other of the seatback and the seat bottom, a latching mechanism for releasably engaging the recliner rod, a recline actuator mechanism for controlling actuation of the latching mechanism, a memory mechanism for identifying the current use position of the seatback and for releasing the latching mechanism to permit forward dumping of the seatback, a trigger assembly for preventing re-engagement of the latching mechanism until the seatback is returned to its previous use position, and a dump actuator mechanism for controlling actuation of the memory mechanism.

The latching mechanism is normally operable in a latched mode for securing the recliner rod in a fixed position relative to the housing, thereby retaining the seatback in a selected use position. The latching mechanism is also operable in an unlatched mode wherein the recliner rod is free to move linearly relative to the housing. The recline actuator mechanism is operable for shifting the latching mechanism from its latched mode to its unlatched mode when it is desired to adjust the reclination angle of the seatback. The memory mechanism is normally operable in a non-actuated mode for permitting independent actuation of the latching mechanism by the recline actuator mechanism. When it is necessary to move the seatback to a forward dumped position, a dump actuator mechanism is selectively actuated for shifting the latching mechanism to its unlatched mode in response to the memory mechanism being shifted into an actuated mode. Moreover, the memory mechanism is operably interconnected to the latching mechanism so as to maintain the latching mechanism in its unlatched mode during forward dumping of the seatback, and thereafter until the seatback is returned to its previous use position. A trigger assembly is operably associated with the memory mechanism and the latching mechanism to ensure that the latching mechanism remains in its unlatched mode until the seatback is returned to the previous use position and the memory mechanism is in its non-actuated mode. In this regard, the trigger assembly prevents a false locking condition and ensures proper sequential operation of the dump actuator mechanism, the memory mechanism, and the latching mechanism such that the seatback is first returned to its previous use position, then the memory mechanism is returned to its non-actuated mode, and thereafter the latching mechanism is returned to its latched mode appropriately.

Further scope of applicability of the present invention will become apparent from the detailed description given hereafter. However, it should be understood that the detailed description and specific example, while indicating a preferred embodiment of the present invention, is given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given here and below and the accompanying drawings wherein:

FIG. 3 is a side view of the linear recliner assembly showing the latching mechanism in a latched mode and the memory mechanism is a non-actuated mode;

FIG. 4 is a side view, similar to FIG. 3, showing the latching mechanism in an unlatched mode and the memory mechanism in a non-actuated mode.

DETAILED DESCRIPTION OF THE INVENTION

Figure 1:
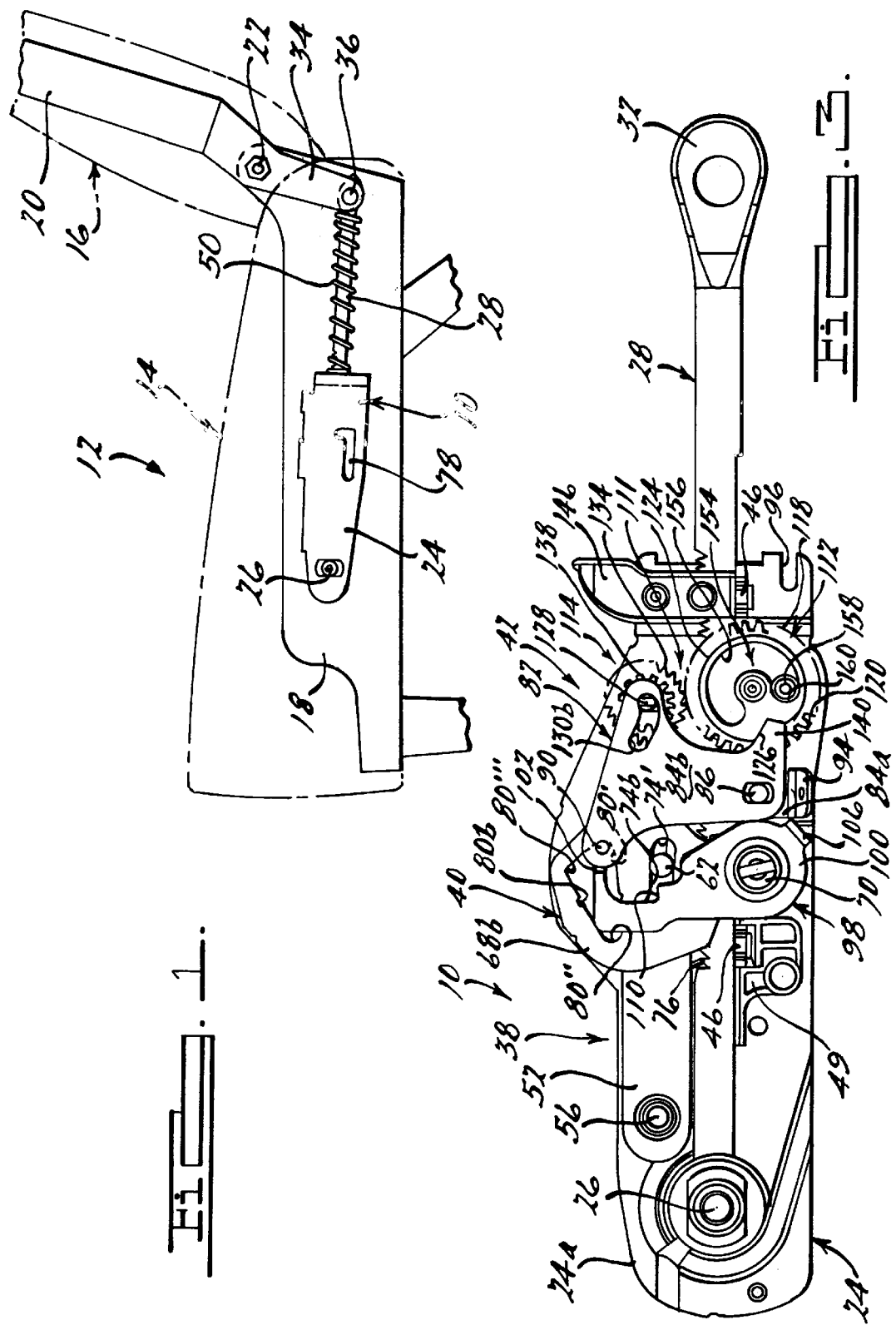
FIG. 1 is a side elevational view of a seat assembly showing a linear recliner assembly of the present invention located along an outer edge of the seat assembly.
Figure 2:
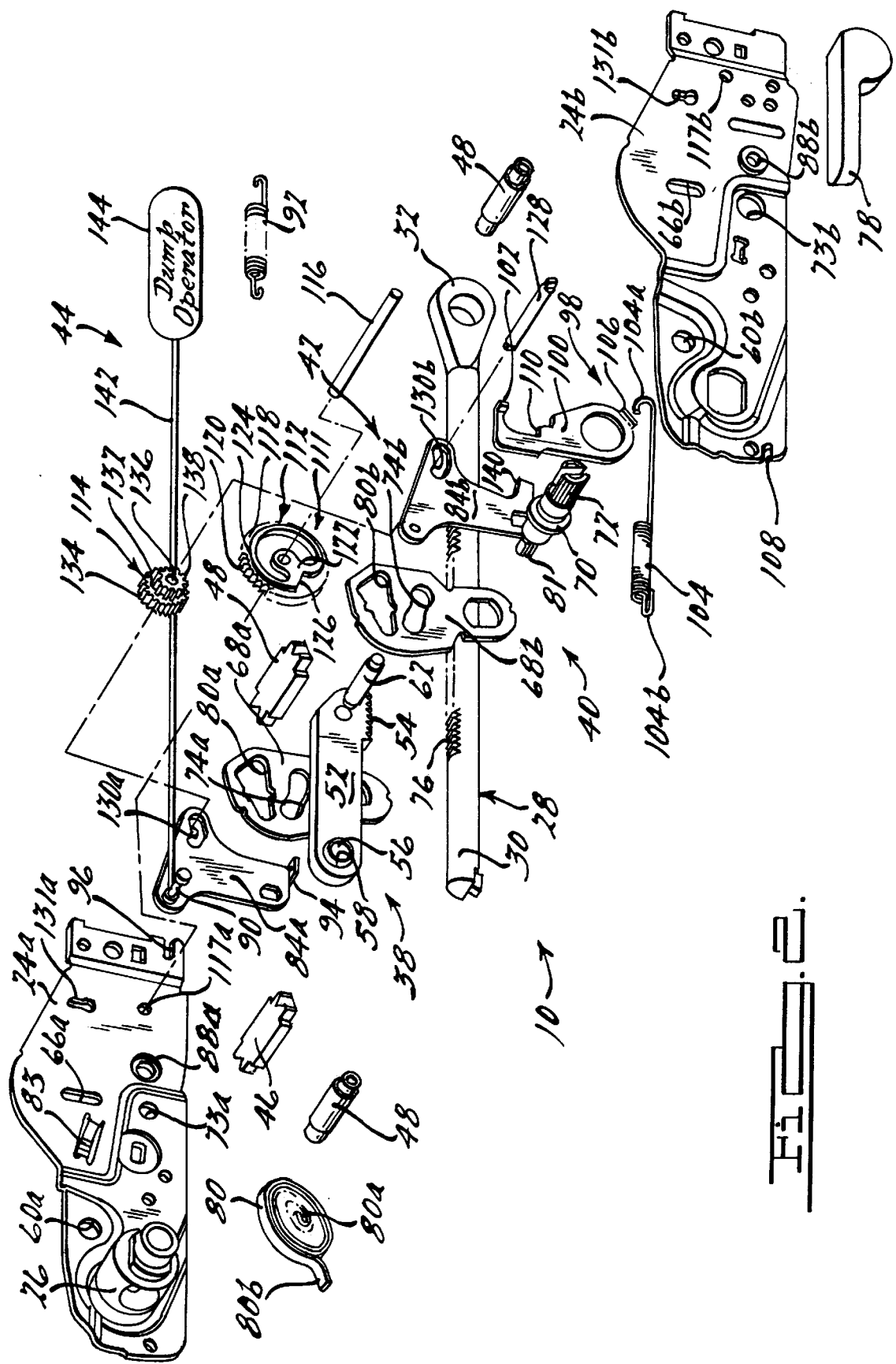
FIG. 2 is a partial exploded perspective view of the linear recliner assembly of the present invention.

The present invention relates to a linear recliner assembly 10 shown in FIG. 1 to be incorporated into a seat assembly 12 having an upholstered seat bottom 14 and an upholstered seatback 16. Seat assembly 12 may be of a type contemplated for use in the front seat of a motor vehicle. For example, seat assembly 12 may be of the "all-belts-to-seat" type (i.e., stand alone structural seats). The structural frame for seat assembly 12 includes a pair of lateral side rails 18 integrated into seat bottom 14 and a pair of lateral support rails 20 integrated into seatback 16. Each lateral support rail 20 is pivotally coupled at a pivot 22 to a corresponding lateral side rail 18 such that seatback 16 is supported for angular movement relative to seat bottom 14. Linear recliner assembly 10 is operable for permitting selective reclining movement of seatback 16 through a range of use positions defined between an upright position and a fully-reclined position. Linear recliner assembly 10 is further operable for permitting seatback 16 to be pivoted from any use position to a forward dumped position, thereby providing greater access to the area located behind seat assembly 12. Upon return of seatback 16 from its forward dumped position, linear recliner assembly 10 is adapted to re-latch seatback 16 in its previous or last use position.

In accordance with the particular construction shown, linear recliner assembly 10 includes a housing 24 pivotally coupled to one of lateral side rails 18 by trunion 26, and a recliner rod 28 having a first end 30 supported within housing 24 for relative linear motion therein and a second end 32 pivotally coupled to a lever arm 34 extending downwardly from lateral support rail 20 by a hinge pin 36. Linear recliner assembly 10 further includes a latching mechanism 38 for releasably latching first end 30 of recliner rod 28 to housing 24, a recline actuator mechanism 40 for controlling actuation of latching mechanism 38, a memory mechanism 42 for causing latching mechanism 38 to automatically re-latch seatback 16 in its previous use position after a forward dumping thereof, and a dump actuator mechanism 44 for controlling actuation of memory mechanism 42.

As will be readily appreciated by those skilled in the art, linear recliner assembly 10 can alternatively be located in seatback 16 of seat assembly 12. In particular, when positioned in this alternative manner, seat recliner assembly 10 is pivotably mounted via trunion 26 to one of support rails 20 of the seatback frame and second end 32 of recliner rod 28 is connected to side rail 18 of the seat bottom frame at a point located rearwardly of pivot 22. In all other respects, linear recliner assembly 10 operates in the same manner regardless of its mounting position in seat bottom 14 or seatback 16.

Housing 24 is shown to include a pair of laterally spaced housing plates 24a, 24b that are interconnected, such as by suitable clips 46 and fasteners 48. First end 30 of recliner rod 28 is slidably supported on clip 46 and a rod guide 49 within housing 24. As illustrated in FIG. 1, a return spring 50 is concentrically mounted on recliner rod 28 for normally urging seatback 16 to rotate counter-clockwise about pivots 22, thereby assisting in returning seatback 16 from any reclined use position to its upright position.

Latching mechanism 38 is supported in housing 24 for selectively allowing linear sliding motion of reclining rod 28 relative to housing 24. In particular, latching mechanism 38 is operable in a "latched" mode for engaging and securing recliner rod 28 in a fixed position relative to housing 24, thereby preventing movement of support rail 20 about pivot 22 so as to maintain seatback 16 in a selected use position. Latching mechanism 38 is also operable in an "unlatched" mode wherein recliner rod 28 is free to move linearly relative to housing 24. With latching mechanism 38 in its unlatched mode, linear movement of recliner rod 28 in a first (i.e., forward) direction relative to housing 24 results in rearward angular movement of seatback 16, while linear movement of recliner rod 28 in a second (i.e., rearward) direction relative to housing 24 results in forward angular movement of seatback 16. Recline actuator mechanism 40 is operable for selectively shifting latching mechanism 38 from its latched mode into its unlatched mode when adjustment of the use position of seatback 16 is desired. As will be detailed, latching mechanism 38 is biased to normally function in its latched mode.

According to a preferred construction of linear recliner assembly 10, latching mechanism 38 includes a locking pawl 52 having locking teeth 54 formed thereon. Locking pawl 52 is pivotally attached to housing 24 by a pivot post 56 journalled in an aperture 58 formed in pawl 52 and which extends through aligned apertures 60a, 60b formed respectively in housing plates 24a, 24b. Pawl 52 further includes a follower pin 62 which extends through a pawl aperture 64 and is further retained in guide slots 66a, 66b formed in housing 24.

Latching mechanism 38 also includes a pair of laterally-spaced cam plates 68a, 68b that are fixed (i.e., keyed) to an actuator shaft 70 supported for rotation relative to housing 24 and which includes a splined end portion 72. The opposite ends of actuator shaft 70 extend outwardly through journal apertures 73a, 73b formed respectively in housing plates 24a, 24b. Cam plates 68a, 68b have corresponding cam slots 74a, 74b through which follower pin 62 of locking pawl 52 extends. Latching mechanism 38 is actuated by rotating actuator shaft 70 and cam plates 68a, 68b which, in turn, moves follower pin 62 due to the contour of cam slots 74a, 74b. As such, the matching contour of cam slot 74a, 74b is designed such that rotation of actuator shaft 70 and cam plates 68a, 68b causes corresponding rotation of locking pawl 52 about pivot pin 56. In particular, FIG. 3 illustrates cam plates 68a, 68b rotated to a first position whereat follower pin 62 is positioned in a lower rearward segment 74' of cam slots 74a, 74b such that locking pawl 52 is located in a locked position. With locking pawl 52 in its locked position, pawl teeth 54 are meshed with teeth 76 formed on recliner rod 28, thereby inhibiting linear movement of recliner rod 28 relative to housing 24 and establishing the latched mode of latching mechanism 38. In contrast, cam plates 68a, 68b are shown in FIG. 4 rotated to a second position whereat follower pin 62 is positioned in an upper forward segment 74" of cam slots 74a, 74b and locking pawl 52 is located in a released position. With locking pawl 52 in its released position, pawl teeth 54 are disengaged from teeth 76 on recliner rod 28, thereby permitting linear movement of recliner rod 28 relative to housing 24 and establishing the unlatched mode of latching mechanism 38.

To rotate cam plates 68a, 68b between their first and second positions, recline actuator mechanism 40 is shown to include a handle 78 that is fixed to end portion 72 of actuator shaft 70. In addition, a torsion spring 80 is provided for biasing cam plate 68a, 68b toward their first position. Torsion spring 80 has a first end 80a fixed to a grooved end portion 81 of actuator shaft 70 and a second end 80b fixed to a flange 83 extending from housing plate 24a. Thus, the biasing of torsion spring 80 must be overcome by manipulation of handle 78 before cam plates 68a, 68b can be moved from the first position to the second position for moving locking pawl 52 from its locked position into its released position when it is desired to shift latching mechanism 38 from its latched mode into its unlatched mode. As shown, handle 78 is located adjacent to seat bottom 14 to facilitate manipulation thereof. As an alternative, handle 78, or any other equivalent recline operator, could be operably connected by a cable assembly to a lower portion of one of cam plates 68a, 68b if a remotely located recline actuator mechanism is preferred for use with seat assembly 12.

With continued reference to the drawings, memory mechanism 42 is normally operable in a "non-actuated" mode for permitting independent actuation of latching mechanism 38 via manipulation of handle 78 for selectively adjusting the angulation of seatback 16 to a desired use position as heretofore described. However, when it is desired to move seatback 16 to its forward dumped position, dump actuator mechanism 44 is selectively actuated for automatically shifting latching mechanism 38 into its unlatched mode in response to memory mechanism 42 being shifted into an "actuated" mode. Memory mechanism 42 is operably interconnected to latching mechanism 38 so as to maintain latching mechanism 38 in its unlatched mode during forward dumping of seatback 16, and thereafter until seatback 16 is returned to its last or previous use position. When seatback 16 is located in its previous use position, memory mechanism 42 automatically shifts back into its non-actuated mode which, in turn, permits latching mechanism 38 to shift back into its latched mode.

According to a preferred construction for linear recliner assembly 10, memory mechanism 42 includes a release assembly 82 having a pair of laterally spaced release plates 84a, 84b which are supported for pivotal movement on a shaft 86, the opposite ends of which extend through aligned apertures 88a, 88b formed in housing 24. Release assembly 82 also includes a drive pin 90 which directly interconnects release plates 84a, 84b together for synchronous pivotal movement about shaft 86. Drive pin 90 also extends through a pair of aligned triangular guide slots 80a, 80b formed respectively in cam plates 68a, 68b to provide means for operably interconnecting release assembly 82 with latching mechanism 38. As shown in FIGS. 3 and 4, guide slots 80a, 80b are configured to provide a lost-motion feature such that drive pin 90 moves from a position adjacent a first corner 80' to a position adjacent a second corner 80" as cam plates 68a, 68b pivot between their first and second position in response to actuation of recline actuator mechanism 40 without causing corresponding pivotal movement of release assembly 82. Thus, with memory mechanism 42 in its non-actuated mode, latching mechanism 38 can be independently shifted between its latched and unlatched modes for adjusting the use position of seatback 16.

Dump actuator mechanism 44 is operably connected to drive pin 90 to cause movement of release assembly 82 from a first position (FIG. 3) to a second position (FIG. 5) when it is desired to move seatback 16 to its forward dumped position. Such movement of release assembly 82 from its first position to its second position in response to actuation of dump actuator mechanism 44 causes memory mechanism 42 to be shifted from its non-actuated mode into its actuated mode. In particular, when memory mechanism 42 is in its non-actuated mode, release assembly 82 is located in its first position with drive pin 90 located adjacent first corner 80' of guide slots 80a, 80b such that cam plates 68a, 68b are biased by torsion spring 80 to their first position. However, when memory mechanism 42 is shifted into its actuated mode, the resulting pivotal movement of release assembly 82 from its first position to its second position causes drive pin 90 to move along a cam surface 148 of guide slots 80 from a position adjacent to first corner 80' to a position adjacent a third corner 80" which, in turn, causes cam plates 68a, 68b to rotate from their first position to their second position, thereby causing latching mechanism 34 to be shifted into its unlatched mode. A biasing spring 92 is provided to normally bias release assembly 82 toward its first position. Biasing spring 92 has a first end fixed to a spring flange 94 on release plate 84a and a second end retained in a slot 96 in housing plate 24a. While the present invention discloses generally triangular-shaped guide slots 80 formed in cam plates 68a, 68b, various alternative configurations may be utilized to achieve the above-described lost motion during independent actuation of latching mechanism 38 and the camming motion for actuating the latching mechanism 38 in response to actuation of memory mechanism 42.

To provide means for moving release assembly 82 from its first position to its second position, dump actuator mechanism 44 is shown to include a cable assembly 142 interconnecting drive pin 90 to a dump operator 144. While only schematically illustrated in the drawings, cable assembly 142 is of the type which includes an inner cable having a first end connected to drive pin 90 and a second end operably coupled to dump operator 144 which may be a pull or pivoting handle, or any other equivalent device, mounted to seat assembly 12 in a convenient location for selective manipulation thereof. A locator bracket 146 is fixed to housing 24 for mounting a portion of cable assembly 142 thereto.

Figure 5:
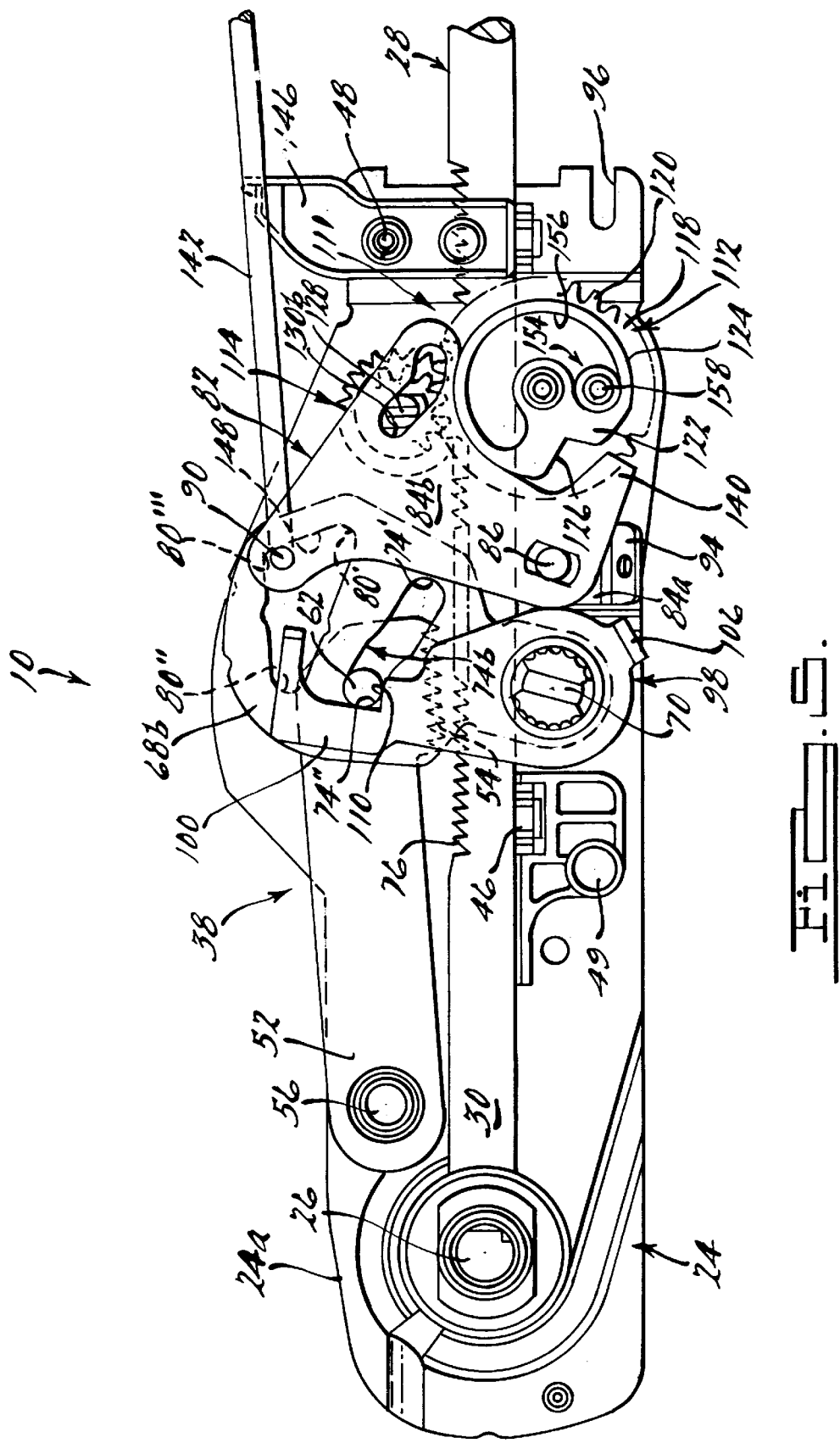
FIG. 5 is a side view, similar to FIG. 3, showing the latching mechanism in an unlatched mode and the memory mechanism in an actuated mode.

Linear recliner assembly 10 further includes a trigger assembly 98 operable for holding cam plates 68a, 68b in their second position until release assembly 82 has been returned to its first position, thereby preventing engagement of locking pawl 52 with recliner rod 28 until seatback 16 is positively located in its previous use position. Trigger assembly 98 includes a trigger cam 100 rotatably supported on actuator shaft 70 and having a flanged arm 102 adapted to engage an edge surface of release plate 84b. A biasing spring 104 biases trigger cam 100 into continuous engagement with the edge surface of release plate 84b such that trigger cam 100 moves in coordination with rotational movement of release assembly 82. In particular, biasing spring 104 has a first end 104a fixed to a spring flange 106 on trigger cam 100 and a second end 104b retained in a slot 108 formed in housing plate 24b. Trigger cam 100 also includes a stepped shoulder portion defining a detent 110 which is adapted to engage follower pin 62 when memory mechanism 42 is actuated. More specifically, when dump operator 144 is actuated and release assembly 82 is rotated from its first position to its second position, biasing spring 104 causes trigger cam 100 to concurrently rotate from a released position (FIG. 3) to a lockout position (FIG. 5). With trigger cam 100 in its released position, follower pin 62 does not engage detent 110. In contrast, movement of trigger cam 100 to its lockout position acts, in conjunction with movement of cam plates 68a, 68b to their second position, to position follower pin 62 within detent 110. Thus, movement of trigger cam 100 to its lockout position causes follower pin 62 to be held in upper portion 74" of guide slots 74a, 74b, thereby positively holding cam plates 68a, 68b in their second position and retaining lock pawl 52 in its released position.

Memory mechanism 42 is further shown to include indexing assembly 111 comprised of cam gear 112 and index gear 114. Cam gear 112 is rotatably supported on shaft 116 which extends through apertures 117a, 117b formed respectively in housing plates 24a, 24b. Cam gear 112 includes a gear segment 118 having external gear teeth 120 formed thereon. Cam gear 112 also includes a raised cam segment 122 having a circular outer cam surface 124 and a locking detent 126 formed therein. Index gear 114 is rotatably supported on a shaft 128 which extends through a pair of aligned slots 130a, 130b formed respectively in release plate 84a, 84b. The ends of shaft 128 also extend into vertical slots 131a, 131b formed respectively in housing plates 24a, 24b. Index gear 114 is a compound gear and includes a first gear segment 132 having gear teeth 134 formed thereon and a second gear segment 136 having gear teeth 138 formed thereon. Index gear 114 is located between release plates 84a, 84b and is oriented relative to recliner rod 28 and cam gear 112 such that its gear teeth 134 are aligned with teeth 76 on recliner rod 28 while gear teeth 138 are aligned with gear teeth 120 on cam gear segment 118. Moreover, the contour of slots 130a, 130b is such that index gear 114 moves in a generally vertical linear manner between a disengaged position and an engaged position in response to corresponding rotational movement of release assembly 82 between its first position and its second position. With index gear 114 in its disengaged position, gear teeth 134 are disengaged from teeth 76 on recliner rod 28 and gear teeth 138 are disengaged from gear teeth 120 on cam gear 112. However, when index gear 114 is in its engaged position, gear teeth 134 are meshed with teeth 76 on recliner rod 28 and gear teeth 138 are meshed with gear teeth 120 on cam gear 112.

Referring specifically to FIG. 3, memory mechanism 42 is shown in its non-actuated mode such that release assembly 82 is in its first position whereat a follower segment 140 of release plate 84b is retained within locking detent 126 on cam gear 112. Biasing spring 92 acts on release assembly 82 to urge follower segment 140 against locking detent 126. When release assembly 82 is located in its first position, trigger cam 100 is located in its released position and index gear 114 is located in its disengaged position. Additionally, as previously described, cam plates 68a, 68b are normally biased by torsion spring 80 to their first position. Thus, when memory mechanism 38 is in its non-actuated mode, release assembly 82 is in its first position and drive pin 90 is free to move within guide slots 80a, 80b between first corner 80' and second corner 80" in response to pivotal movement of cam plates 68a, 68b between their first and second positions caused by selective actuation of recline actuator mechanism 40 when it is desired to adjust the use position of seatback 16.

When it is desired to move seatback 16 from its use position to its forward dumped position, dump operator 144 is manipulated to pull drive pin 90 in a rearward (i.e., to the right in FIG. 5) direction. As noted, such movement of drive pin 90 causes release assembly 82 to be pivoted, in opposition to biasing spring 92, from its first position to its second position. When release assembly 82 is in its second position, follower segment 140 of release plate 84b is released from locking detent 126 and index gear 114 is moved into its engaged position. Such intermeshing of the respective gear teeth between index gear 114, cam gear 112 and recliner rod 28 acts to define an index point between recliner rod 28 and housing 24, thereby identifying the current use position of seatback 16. To ensure that the current position of recliner rod 28 is identified prior to any movement thereof, memory mechanism 42 is designed to locate index gear 114 in its engaged position prior to cam plates 68a, 68b being completely shifted into their second position.

Upon actuation of dump actuator mechanism 44, drive pin 90 engages cam surface 148 of guide slots 80a, 80b in cam plates 68a, 68b so as to cause rotation thereof to their second position in opposition to the biasing of torsion spring 80. As shown in FIG. 5, this rotation of cam plates 68a, 68b causes follower pin 62 to ride up cam slots 74a, 74b and move locking pawl 52 to its released position, thereby shifting latching mechanism 38 into its unlatched mode. Moreover, due to movement of trigger cam 100 to its lockout position, follower pin 62 is also located within detent 110 of trigger cam 100, thereby holding locking pawl 52 in its released position. Once latching mechanism 34 is in its unlatched mode, subsequent forward angular movement of seatback 16 to its dumped position causes recliner rod 28 to move linearly in a rearward direction relative to housing 24. Since index gear 114 is in its engaged position, such rearward linear movement of recliner rod 28 causes index gear 114 to rotate in a counter-clockwise direction which, in turn, causes cam gear 112 to rotate through a certain range of angular travel in a clockwise direction. Such rotation of cam gear 112 causes follower segment 140 of release plate 84b to bear against cam surface 124, whereby release assembly 82 is held in its second position and memory mechanism 42 is maintained in its actuated mode during forward dumping of seatback 16. As such, when release assembly 82 is held in its second position, drive pin 90 holds cam plates 68a, 68b in their second position which, in turn, holds locking pawl 52 in its released position. Thus, latching mechanism 38 is shifted, and then positively held in its unlatched mode, when memory mechanism 42 is shifted into and maintained in its actuated mode.

When it is thereafter desired to return seatback 16 from its forward dumped position to its previous use position, seatback 16 is pivoted rearwardly which causes recliner rod 28 to move linearly in a forward direction relative to housing 24. This forward linear movement of recliner rod 28 causes index gear 114 to rotate in a clockwise direction which, in turn, causes cam gear 112 to rotate through the same range of angular travel in a counter-clockwise direction. Such rotation of cam gear 112 causes follower segment 140 to continue to bear against cam surface 124 until seatback 16 is located in the previous use position. Once seatback 16 is located in its previous use position, follower segment 140 disengages cam surface 124 and, due to the urging of biasing spring 92, re-engages locking detent 126, thereby moving release assembly 82 to its first position for shifting memory mechanism 42 back into its non-actuated mode. Additionally, due to engagement of flange 102 on trigger cam 100 with the edge surface of release cam 84b, this movement of release assembly 82 from its second position back to its first position causes trigger cam 100 to rotate from its lockout position to its released position for releasing follower pin 62 from detent 110. Once follower pin 62 is released from detent 110, cam plates 68a, 68b move from their second position to their first position, due to the biasing of torsion spring 80, thereby moving locking pawl 52 from its released position to its locked position for shifting latching mechanism 38 back into its latched mode. Thus, trigger assembly 98 functions to release lock pawl 52 for movement to its locked position only after release assembly 82 has been returned to its first position.

The number of gear teeth associated with the meshed gear components is selected such that, during forward dumping of seatback 16 from any available use position, follower segment 140 maintains engagement with cam surface 124 in response to rotation of cam gear 112 in the clockwise direction without re-entering locking detent 126. Thus, trigger assembly 98 ensures that locking pawl 52 of latching mechanism 38 remains in its released position until seatback 16 is returned to the previous use position to eliminate false locking conditions.

As an additional feature, memory mechanism 42 of linear recliner assembly 10 further includes seatback stop mechanism 154 which functions to prevent rearward reclining movement of seatback 16 upon actuation of dump actuator mechanism 44. Specifically, seatback stop mechanism 154 functions to hold seatback 16 in its use position during the initial period required to initiate forward dumping of seatback 16 following actuation of memory mechanism 42 into its actuated mode. Seatback stop mechanism 154 includes arcuate groove 156 formed in cam segment 122 of cam gear 112 and a follower pin 158 extending inwardly from housing plate 24b which is retained within arcuate groove 156. When memory mechanism 42 is in its actuated mode with release assembly 82 in the second position, forward linear movement of recliner rod 28 is prevented by follower pin 158 engaging an end surface 160 of groove 156. Specifically, since cam gear 112 is held against rotation relative to housing 24 by pin 158 engaging end surface 160 and index gear 114 is meshed with both cam gear 112 and recliner rod 28 when release assembly 82 is in the cammed position, then recliner rod 28 is thereby prevented from moving in a forward direction. The length of arcuate groove 156 is selected to permit the amount of rotation of cam gear 112 that is required for rearward movement of recliner rod 28 during forward dumping of seatback 16. As such, seatback stop mechanism 154 does not interfere with forward dumping of seatback 16, or with the return of seatback 16 to the previous use position. Seatback stop mechanism 154 only inhibits rearward movement of seatback 16 when memory mechanism 42 is in its actuated mode and, as such, is effectively disabled when memory mechanism 42 is in its non-actuated mode.

The foregoing discussion discloses and describes an exemplary embodiment of the present invention. One skilled in the art will readily recognize from such discussion and from the accompanying drawings and claims, that various changes, modifications and variations can be made therein without departing from the true spirit and fair scope of the invention as defined in the following claims.

What is claimed is:

1. A linear recliner assembly for use in a seat assembly having a seat bottom and a seatback pivotally coupled to the seat bottom, comprising:

a housing adapted to be mounted to one of the seat bottom and the seatback;

a recliner rod having a first end supported for linear motion with respect to said housing and a second end adapted to be mounted to the other of the seat bottom and the seatback;

a latching mechanism operable in a latched mode for engaging said recliner rod at a selected position to prevent said relative linear motion and retain the seatback in a use position relative to the seat bottom, said latching mechanism is further operable in an unlatched mode for disengaging said recliner rod to permit said relative linear motion;

a recline actuator mechanism for selectively shifting said latching mechanism from its latched mode into its unlatched mode to permit adjustment of the use position of the seatback;

a memory mechanism operable in a non-actuated mode to permit actuation of said latching mechanism by said recline actuator mechanism, said memory mechanism is further operable in an actuated mode for shifting said latching mechanism into its unlatched mode to disengage said recliner rod independent of said recline actuator mechanism for permitting said relative linear motion such that said recliner rod is movable from said selected position to a dump position in response to movement of the seatback from the use position to a forward dumped position;

a trigger assembly supported from said housing and operably associated with said memory mechanism and said latching mechanism such that said trigger assembly is moved to a lockout position in response to said memory mechanism being shifted into its actuated mode for engaging and locking said latching mechanism in its unlatched mode, and wherein movement of said recliner rod from said dump position to said selected position causes said memory mechanism to be shifted into its non-actuated mode which causes said trigger assembly to be moved to a released position for disengaging and releasing said latching mechanism to permit said latching mechanism to return to its latched mode; and a dump actuator mechanism operable for selectively shifting said memory mechanism between its non-actuated mode and its actuated mode.

2. The linear recliner assembly of claim 1 wherein said memory mechanism further comprises an indexing assembly rotatably coupled with said recliner rod when said memory mechanism is in its actuated mode such that said indexing assembly is rotated in a first direction through an angular amount as said recliner rod moves from said selected position to said dump position, and said indexing assembly is rotated in a second direction which is opposite said first direction through said angular amount as said recliner rod moves from said dump position to said selected position.

3. The linear recliner assembly of claim 2 wherein said indexing assembly comprises an index gear having first gear teeth formed thereon which are adapted to meshingly engage teeth on said recliner rod when said memory mechanism is shifted into its actuated mode for providing an index point identifying said selected position.

4. The linear recliner assembly of claim 3 wherein said memory mechanism further comprises a cam gear having cam teeth formed thereon which are adapted to meshingly engage second gear teeth formed on said index gear when said memory mechanism is shifted into its actuated mode such that rotation of said cam gear.

5. The linear recliner assembly of claim 1 wherein said latching mechanism includes a locking pawl coupled to said housing and having pawl teeth formed thereon which are adapted to meshingly engage teeth formed on said recliner rod when said latching mechanism is in its latched mode.

6. The linear recliner assembly of claim 1 wherein said trigger assembly comprises a spring-biased trigger cam pivotally coupled to said housing and which engages a movable component of said memory mechanism to permit coordinated movement thereof in response to said memory mechanism being shifted between its non-actuated and actuated modes.

7. The linear recliner assembly of claim 6 wherein said trigger cam includes a shoulder portion formed thereon which engages said latching mechanism when said memory mechanism is shifted into said actuated mode.

8. A linear recliner assembly for use with a seat assembly having a seatback supported for pivotal movement relative to a seat bottom, comprising:

a housing adapted to be secured to one of the seat bottom and the seatback;

a recliner rod having a first end adapted to be attached to the other of the seat bottom and the seatback and a second end supported for sliding movement relative to said housing and having teeth formed thereon;

a latching mechanism operable in a latched mode for securing said recliner rod in a fixed position relative to said housing for retaining the seatback in a use position, said latching mechanism further operable in an unlatched mode for releasing said recliner rod for movement relative to said housing;

a recline actuator mechanism for selectively shifting said latching mechanism from its latched mode into its unlatched mode to permit adjustment of the use position of the seatback;

a memory mechanism operable in a non-actuated mode for permitting independent actuation of said latching mechanism, said memory mechanism further operable in an actuated mode for automatically shifting said latching mechanism into its unlatched mode to permit movement of the seatback from its use position to a forward dumped position, said memory mechanism including a gear that is disengaged from said teeth of said recliner rod when said memory mechanism is in its non-actuated mode and which is adapted to meshingly engage said teeth on said recliner rod at a position corresponding to the use position of the seatback when said memory mechanism is shifted into its actuated mode, wherein said gear is rotatably indexed in a first direction through a certain amount of angular motion in response to movement of said recliner rod in a first direction caused by movement of the seatback from its use position to its forward dumped position, and wherein said gear is thereafter rotatably indexed in a second direction through said certain amount of angular motion in response to movement of said recliner rod in a second direction caused by movement of the seatback from its forward dumped position to its use position for causing said memory mechanism to be shifted into its non-actuated mode and said latching mechanism into its latched mode for relatching the seatback in its use position;

a dump actuator mechanism for selectively shifting said memory mechanism from said non-actuated mode to said actuated mode; and a trigger assembly including a trigger cam supported from said housing for movement between a released position and a lockout position and a spring for biasing said trigger cam to said lockout position, said trigger cam is held in said released position by said memory mechanism when said memory mechanism is in its non-actuated mode, and said trigger cam moves to said lockout position when said memory mechanism is shifted into its actuated mode and engages said latching mechanism to retain said latching mechanism in its unlatched mode.

9. The linear recliner assembly of claim 8 further comprising a seatback stop arrangement for preventing rotation of said gear in said second direction when said recliner rod is located in said position corresponding to the use position of the seatback.

10. The linear recliner assembly of claim 9 wherein said seatback stop arrangement includes an arcuate slot formed in said gear and a follower pin fixed to said housing which extends into said gear, said follower pin engages an end surface of said arcuate slot to inhibit rotation of said gear in said second direction when said recliner rod is in said position corresponding to the use position of the seatback.

11. The linear recliner assembly of claim 8 wherein said gear is an index gear and said memory mechanism further includes a cam gear rotatably supported from said housing, said index gear being disengaged from said cam gear and said teeth on said recliner rod when said memory mechanism is in its non-actuated mode and said index gear moves into meshed engagement with said cam gear and said teeth on said recliner rod at said position corresponding to the use position of the seatback when said memory mechanism is shifted into its actuated mode, wherein subsequent movement of the seatback from its use position to its forward dumped position causes movement of said recliner rod in said first direction relative to said housing which causes rotation of said index gear in said first direction and rotation of said cam gear in a first direction, and wherein subsequent movement of the seatback from its forward dumped position toward its use position causes movement of said recliner rod in said second direction relative to said housing for causing rotation of said index gear in said second direction and rotation of said cam gear in a second direction.

12. The linear recliner assembly of claim 11 wherein said memory mechanism further includes a release plate supported from said housing for movement between a first position whereat a locking segment thereof is retained in a locking detent formed in said cam gear for inhibiting rotation of said cam gear when said memory mechanism is in its non-actuated mode, and a second position whereat said locking segment is released from said locking detent for permitting rotation of said cam gear when said memory mechanism is in its actuated mode, said index gear is supported on said release plate such that said index gear is disengaged from said cam gear and said teeth on said recliner rod when said release plate is in its first position and said index gear is meshed therewith when said release plate is in its second position, and wherein said dump actuator mechanism is coupled to said release plate for moving said release plate from its first position to its second position, wherein movement of said release plate from its first position to its second position causes said locking segment thereof to move out of engagement with said locking detent in said cam gear and causes said index gear to engage said teeth of said recliner rod at said position corresponding to the use position of the seatback, subsequent movement of the seatback from its use position to its forward dumped position causes linear movement of said recliner rod in said first direction which causes said index gear to rotate said cam gear in said first direction for moving said locking segment of said release plate into engagement with a cam surface on said cam gear for maintaining said release plate in its second position, and wherein subsequent movement of the seatback from its dumped position causes linear movement of said recliner rod in said second direction which causes said index gear to rotate said cam gear in said second direction until said recliner rod is located in said position corresponding to the previous use position of the seatback whereat said locking segment of said release plate disengages said cam surface of said cam gear and moves into engagement with said locking detent for moving said release plate to its first position thereby latching the seatback in its previous use position.

13. The linear recliner assembly of claim 12 wherein said trigger cam is biased by said spring into engagement with said release plate such that said trigger cam is located in its released position when said release plate is in its first position and said trigger cam is located in its lockout position when said release plate is in its second position, said trigger cam is operable in its lockout position to hold a locking pawl associated with said latching mechanism in a released position disengaged from said recliner rod, whereby movement of said release plate to its first position causes said trigger cam to move to its released position and release said locking pawl for subsequent movement to a locked position engaged with said recliner rod.

14. A linear recliner assembly for use in a seat assembly having a seatback supported for pivotal movement relative to a seat bottom, comprising:

a housing adapted to be secured to one of the seat bottom and the seatback;

a recliner rod having a first end attached to the other of the seat bottom and the seatback and a second end supported in said housing, said second end of said recliner rod having teeth formed thereon;

a locking pawl supported from said housing for movement between a locked position inhibiting movement of said recliner rod relative to said housing and a released position permitting movement of said recliner rod, whereby movement of said recliner rod in a first direction corresponds to forward pivotal movement of the seatback toward a forward dumped position and movement of said recliner rod in a second direction corresponds to rearward pivotal movement of the seatback toward a fully-reclined position;

a cam plate supported from said housing for movement between a first position and a second position, said cam plate operably connected to said locking pawl such that movement of said cam plate between its first and second positions causes concurrent movement of said locking pawl between its locked and released positions;

a recliner actuator mechanism for moving said cam plate from its first position to its second position to permit adjustment of the use position of the seatback;

a trigger cam supported from said housing for movement between a lockout position for engaging and holding said locking pawl in its released position and a released position disengaged from said locking pawl;

a cam gear rotatably supported from said housing, said cam gear having a gear segment with gear teeth formed thereon and a cam segment having a cam surface with a locking detent formed therein;

a release plate supported from said housing for movement between a first position whereat a locking segment thereof is retained in said locking detent for preventing rotation of said cam gear and a second position whereat said locking segment is released from said locking detent for permitting rotation of said cam gear, said release plate acts on said trigger cam such that movement of said release plate between its first and second positions cause concurrent movement of said trigger cam between its released and lockout positions, and said release plate is operably coupled to said cam plate such that said cam plate is permitted to move between its first and second positions in response to actuation of said recline actuator mechanism when said release plate is in its first position, and movement of said release plate to its second position causes movement of said cam plate to its second position;

an index gear having gear teeth and which is rotatably supported for on said release plate such that when said release plate is in its first position said index gear is in a disengaged position whereat said gear teeth on said index gear are displaced from said teeth on said recliner rod and said gear teeth on said gear segment of said cam gear, and when said release plate is in its second position said index gear is in an engaged position whereat said gear teeth on said index gear are meshed with said teeth on said recliner rod and said gear teeth on said gear segment of said cam gear; and a dump actuator mechanism for moving said release plate from its first position to its second position when it is desired to dump the seatback from its use position to its forward dumped position.

15. The linear recliner assembly of claim 14 wherein movement of said release plate to its second position causes said index gear to be located in its engaged position so as to meshingly engage said teeth on said recliner rod at a position corresponding to the use position of the seatback, whereby subsequent forward pivotal movement of the seatback to its forward dumped position causes said recliner rod to move in said first direction which causes said index gear to rotate said cam gear in a first direction, such rotation of said cam gear in said first direction causes said locking segment of said release plate to engage said cam surface of said cam gear and thereby hold said release plate in its second position which positions said trigger cam in its lockout position and said cam plate in its second position, and wherein subsequent rearward pivotal movement of the seatback from its forward dumped position causes said recliner rod to move in said second direction which causes said index gear to rotate said cam gear in a second direction until said recliner rod is located in said position corresponding to the previous use position of the seatback whereat said locking segment of said release plate disengages said cam surface and engages said locking detent thereof for moving said release plate to its first position which moves said trigger cam to its released position for permitting subsequent movement of said cam plate to its first position, thereby latching the seatback in its previous use position.

16. The linear recliner assembly of claim 15 wherein said index gear includes a first gear segment having gear teeth adapted to engage said teeth on said recliner rod, and said index gear includes a second gear segment having gear teeth adapted to engage said gear teeth on said cam gear.

17. The linear recliner assembly of claim 15 wherein said index gear is mounted on a shaft extending through a guide slot formed in said release plate such that said index gear is located in its disengaged position when said release plate is in its first position, and wherein movement of said release plate to its second position causes said index gear to move to its engaged position.

18. The linear recliner assembly of claim 15 further comprising a guide slot in said cam plate and a drive pin fixed to said release plate which extends into said guide slot, said guide slot is operable for permitting movement of said cam plate between its first and second positions via actuation of said recline actuator mechanism when said release plate is in its first position, and wherein movement of said release plate to its second position via actuation of said dump actuator mechanism causes said drive pin to engage said guide slot for moving said cam plate to its second position.

19. The linear recliner assembly of claim 15 further comprising a seatback stop arrangement for inhibiting movement of said recliner rod in said second direction when the seatback is in its use position and said dump actuator mechanism is actuated for moving said release plate from its first position to its second position.

20. The linear recliner assembly of claim 19 wherein said seatback stop arrangement includes an arcuate slot formed in said cam gear and a follower pin fixed to said housing which extends into said arcuate slot, said follower pin is adapted to engage a first end of said arcuate slot when the seatback is in its use position and said link is in its second position, thereby inhibiting rotation of said cam gear in said second direction which inhibits movement of said recliner rod in said second direction due to said index gear being meshed with said recliner rod and said cam gear.

21. The linear recliner assembly of claim 15 further comprising a follower pin extending from said locking pawl and which is retained in a cam slot formed in said cam plate for causing coordinated movement of said locking pawl between its locked and released positions in response to movement of said cam plate between its first and second positions, said trigger cam having a detent formed thereon adapted to receive said follower pin therein when said cam plate is in its second position and said trigger cam is in its lockout position, thereby holding said lock pawl in its released position.

* * * * *

UNITED STATES PATENT AND TRADEMARK OFFICE
CERTIFICATE OF CORRECTION

PATENT NO. : 5,979,986
DATED : November 9, 1999
INVENTOR(S) : Srinivas Pejathaya It is certified that error appears in the above-identified patent and that said Letters Patent is hereby corrected as shown below:

Column 10, line 67, claim 4,
after "said", insert --index gear causes rotation of said--.

Signed and Sealed this

Twenty-seventh Day of February, 2001

Attest:

NICHOLAS P. GODICI

Attesting Officer  Acting Director of the United States Patent and Trademark Office